United States Patent
Kim et al.

(10) Patent No.: US 12,234,782 B1
(45) Date of Patent: Feb. 25, 2025

(54) DUAL FUEL ENGINE SYSTEM HAVING FUEL-ACTUATED UNIT PUMPS AND METHOD

(71) Applicant: Caterpillar Inc., Peoria, IL (US)

(72) Inventors: Hoisan Kim, Dunlap, IL (US); Dana Ray Coldren, Secor, IL (US); Lifeng Wang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/373,388

(22) Filed: Sep. 27, 2023

(51) Int. Cl.
*F02D 19/06* (2006.01)
*F02M 43/04* (2006.01)

(52) U.S. Cl.
CPC ..... *F02D 19/0694* (2013.01); *F02D 19/0684* (2013.01); *F02D 19/0689* (2013.01); *F02M 43/04* (2013.01)

(58) Field of Classification Search
CPC ............. F02D 19/0694; F02D 19/0684; F02D 19/0689; F02M 43/04
See application file for complete search history.

(56) References Cited

U.S. PATENT DOCUMENTS

| | | | |
|---|---|---|---|
| 6,805,105 B2 | 10/2004 | Denso | |
| 8,412,439 B2 | 4/2013 | Hardstaff | |
| 9,664,122 B2 | 5/2017 | Coldren et al. | |
| 11,639,698 B1 | 5/2023 | Schroeder et al. | |
| 2010/0174467 A1* | 7/2010 | Ibrahim | F02M 57/026 |
| | | | 123/456 |
| 2011/0155102 A1 | 6/2011 | Ten Broeke | |
| 2017/0159625 A1* | 6/2017 | Brasche | F02M 37/0064 |
| 2021/0156321 A1 | 5/2021 | Yao et al. | |
| 2023/0160330 A1 | 5/2023 | Fan et al. | |

FOREIGN PATENT DOCUMENTS

| | | |
|---|---|---|
| CA | 2758246 A1 | 2/2012 |
| CN | 108533422 A | 9/2018 |
| CN | 208950752 U | 6/2019 |
| CN | 111206999 A | 5/2020 |
| CN | 111720244 A | 9/2020 |
| CN | 211397728 U | 9/2020 |
| CN | 212690211 U | 3/2021 |
| CN | 112796894 A | 5/2021 |
| CN | 113339153 A | 9/2021 |
| DE | 102020116707 A1 | 12/2021 |
| WO | 20130086427 A1 | 6/2013 |

OTHER PUBLICATIONS

Written Opinion and International Search Report for Int'l. Patent Appln. No. PCT/US2024/042007, mailed Nov. 13, 2024 (19 pgs).

* cited by examiner

Primary Examiner — Jacob M Amick
Assistant Examiner — Charles J Brauch
(74) Attorney, Agent, or Firm — Brannon Sowers & Cracraft PC

(57) ABSTRACT

A dual fuel engine system includes an engine, and a fuel system including a pressurized fuel reservoir, a first fuel pump, and a plurality of second fuel pumps each having an actuating fluid inlet fluidly connected to at least one of the first fuel pump or the pressurized fuel reservoir. The plurality of second fuel pumps may intensify or de-intensify a pressure of a second fuel relative to a pressure of the first fuel used to actuate the second fuel pumps so as to obtain an increased flow rate of the second fuel. Related apparatus and methodology is also disclosed.

20 Claims, 4 Drawing Sheets

DUAL FUEL ENGINE SYSTEM HAVING FUEL-ACTUATED UNIT PUMPS AND METHOD

TECHNICAL FIELD

The present disclosure relates generally to a dual fuel engine system, and more particularly to a dual fuel engine system employing a first fuel pump to pressurize a first fuel reservoir and to actuate a plurality of second fuel pumps.

BACKGROUND

Dual fuel internal combustion engine systems are well known and increasingly adopted throughout the world for purposes ranging from electric power generation to operation of vehicular and industrial equipment. Engineers have discovered many different strategies for advantageously utilizing combustion and emissions characteristics of different types of fuel simultaneously or in different engine cycles in an engine cylinder. In one example dual fuel system a relatively small pilot injection of diesel fuel is compression-ignited in a cylinder and used to trigger ignition of a larger, main charge of a gaseous fuel such as natural gas. Other known strategies seek to utilize two different types of liquid fuels, such as diesel fuel and an alcohol fuel such as methanol. Factors driving continued research and development of dual fuel engine systems include a desire for reduced emissions of certain types, fuel economy, and cost.

A significant drawback to certain dual fuel engine implementations is a need for apparatus to supply, contain, pressurize and manage two different types of fuel. In a typical example, two separate and independent pumping systems are required for the two different fuel types, each including a low pressure transfer pump, and a high pressure pump commonly driven off of the engine geartrain. Injection pressures in dual fuel applications can be quite high necessitating relatively large and heavy-duty pumps that can take up considerable space as well as increasing costs. One known dual fuel system is set forth in U.S. Pat. No. 9,664,122 B2 to Coldren et al.

SUMMARY

In one aspect, a dual fuel engine system includes an engine having a plurality of cylinders formed therein, and a fuel system including at least one fuel injector associated with each respective one of the plurality of cylinders, and each at least one fuel injector having a first fuel outlet set and a second fuel outlet set. The fuel system further includes a pressurized fuel reservoir, a first fuel pump having a first fuel pump outlet fluidly connected to the pressurized fuel reservoir, and a plurality of high pressure first fuel conduits each extending from the pressurized fuel reservoir to one of the first fuel outlet sets. The fuel system still further includes a plurality of second fuel pumps each having an actuating fluid inlet and a second fuel pump outlet, a plurality of low pressure second fuel conduits each extending to one of the plurality of second fuel pumps, and a plurality of high pressure second fuel conduits each fluidly connecting one of the second fuel pump outlets to at least one of the respective second fuel outlets sets. The actuating fluid inlet of each respective one of the plurality of second fuel pumps is fluidly connected to at least one of the first fuel pump outlet or the pressurized fuel reservoir.

In another aspect, a method of operating a dual fuel system includes feeding a pressurized first fuel from a first fuel pump to a pressurized fuel reservoir, and feeding the pressurized first fuel to actuating fluid inlets of a plurality of second fuel pumps. The method further includes actuating the plurality of second fuel pumps via the pressurized first fuel to pressurize a second fuel, injecting the pressurized first fuel from a first fuel outlet set fluidly connected to the pressurized fuel reservoir into a cylinder in an engine, and injecting the pressurized second fuel from a second fuel outlet set fluidly connected to one of the plurality of second fuel pumps into the cylinder.

In still another aspect, a dual fuel system includes a plurality of fuel injectors each including at least one of a first fuel outlet set and a second fuel outlet set, and a number of the plurality of fuel injectors is equal to a number of the first fuel outlet sets and a number of the second fuel outlet sets in the dual fuel system. The dual fuel system further includes a pressurized fuel reservoir, a first fuel pump having a first fuel pump outlet fluidly connected to the pressurized fuel reservoir, and a plurality of high pressure first fuel conduits each extending from the pressurized fuel reservoir to one of the first fuel outlet sets. The dual fuel system still further includes a plurality of second fuel pumps each having an actuating fluid inlet and a second fuel pump outlet, a plurality of low pressure second fuel conduits each extending to one of the plurality of second fuel pumps, and a plurality of high pressure second fuel conduits each fluidly connecting one of the plurality of second fuel pump outlets to at least one of the respective second fuel outlet sets. The dual fuel system still further includes a plurality of actuating fluid conduits each extending from the first fuel pump or the pressurized fuel reservoir to the actuating fluid inlet of one of the plurality of second fuel pumps.

DETAILED DESCRIPTION

Figure 1:
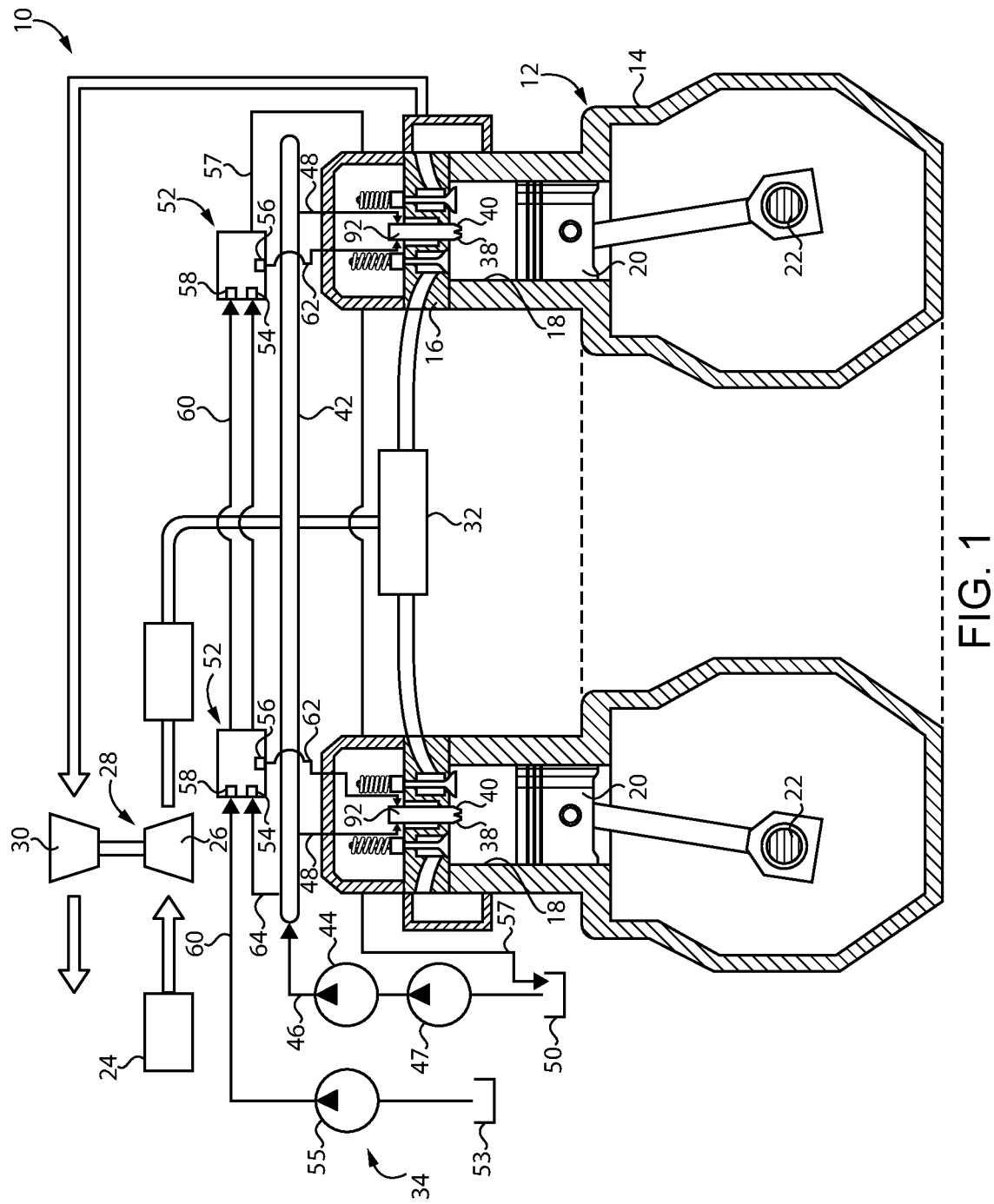
FIG. 1 is a diagrammatic view of a dual fuel engine system, according to one embodiment.

Referring to FIG. 1, there is shown a dual fuel internal combustion engine system 10, according to one embodiment. Engine system 10 includes an internal combustion engine 12 having a cylinder block 14 and a cylinder head 16 attached to cylinder block 14. A plurality of cylinders 18 are formed in cylinder block 14. A plurality of pistons 20 are positioned within cylinders 18 and movable between a bottom-dead-center position and a top-dead-center position to rotate a crankshaft 22. Cylinders 18 can include any number in any suitable arrangement, such as an inline pattern, a V-pattern, or still another. Pistons 20 will typically be movable within cylinders 18 to increase a pressure of fluids therein to an autoignition threshold of a compression-ignition liquid fuel, as further discussed herein. Engine system 10 may be applied in a range of contexts, including for operating an electrical generator, powering a pump or a compressor, or a driveline in a mobile machine such as a marine vessel to name a few examples.

Engine system 10 also includes an intake air inlet 24 structured to feed intake air to a compressor 26 in a turbocharger 28. Exhaust from engine 12 operates a turbine 30 of turbocharger 28. Pressurized intake air is fed to an intake manifold 32 and distributed to cylinders 18 in a generally conventional manner. Engine system 10 will typically be operated in a four-stroke engine cycle and includes suitable valves and exhaust system apparatus for controlling feeding of intake air into cylinders 18 and feeding exhaust out of cylinders 18. Engine system 10 further includes a fuel system 34 having at least one fuel injector 92 associated with each respective one of cylinders 18. Each at least one fuel injector 92, referred to hereinafter at times in the singular, has a first fuel outlet set 38 and a second fuel outlet set 40. Embodiments are contemplated where a single fuel injector includes dual concentric outlet sets as well as embodiments such as that illustrated in FIG. 1 where the respective outlet sets are positioned side-by-side. In still other implementations, each of cylinders 18 may be associated with two separate fuel injectors each including one of a first outlet set and a second fuel outlet set. Each of first fuel outlet set 38 and second fuel outlet set 40 is positioned within one of cylinders 18 for direct injection of a first fuel and a second fuel, respectively, as further discussed herein.

Fuel system 34 further includes a pressurized fuel reservoir 42 and a first fuel pump 44 having a first fuel pump outlet 46 fluidly connected to pressurized fuel reservoir 42. Pressurized fuel reservoir 42 can include a so-called common rail structured to supply pressurized fuel to a plurality of fuel injectors, potentially all fuel injectors, in a fuel system. First fuel pump 44 may be driven off the engine geartrain in some embodiments, and receives a feed of a low pressure first fuel from a first fuel supply 50 by way of a fuel transfer pump 47. First fuel supply 50 may contain a compression-ignition liquid fuel, such as a diesel distillate fuel. Other suitable compression-ignition fuels could include a high octane fuel with a cetane enhancer. Fuel system 34 also includes a plurality of high pressure first fuel conduits 48 each extending from pressurized fuel reservoir 42 to one of the respective first fuel outlet sets 38.

Fuel system 34 further includes a plurality of second fuel pumps 52 each having an actuating fluid inlet 54 and a second fuel pump outlet 56. Second fuel pumps 52 may be understood as hydraulic unit pumps coupled specifically with one, or sometimes a plurality, of cylinders 18. Second fuel pumps 52 may be mounted in a housing, manifold, or frame, or in some embodiments could be coupled directly to individual fuel injectors. A plurality of low pressure second fuel conduits 60 each extend to one of second fuel pumps 52. Fuel system 34 further includes a second fuel supply 53 and a transfer pump 55 structured to feed a second fuel from second fuel supply 53 to each respective fuel inlet 58 by way of low pressure second fuel conduits 60. Second fuel supply 53 may contain an alcohol fuel such as methanol, or various blends including methanol typically but not necessarily predominating. In other instances a different liquid fuel could be used in second fuel supply 53, such as gasoline, naptha, or still others Fuel system 34 also includes a plurality of high pressure second fuel conduits 62 each fluidly connecting one of second fuel pump outlets 56 to at least one of the respective second fuel outlet sets 40. High pressure second fuel conduits 62 may extend to second fuel outlet sets 40, or may fluidly connect one of second fuel pump outlets 56 to one or more of second fuel outlet sets 40 by way of a pressurized fuel reservoir or common rail in some embodiments. The actuating fluid inlet 54 of each respective one of the plurality of second fuel pumps 52 is fluidly connected to at least one of first fuel pump outlet 46 or pressurized fuel reservoir 42. In the illustrated embodiment a high-pressure actuation fluid conduit 64 fluidly connects directly from pressurized fuel reservoir 42 to each respective actuating fluid inlet 54. A low pressure return line 57 conveying spent actuating fuel fluidly connects from at least one of second fuel pumps 52 to fuel supply 50.

Figure 2:
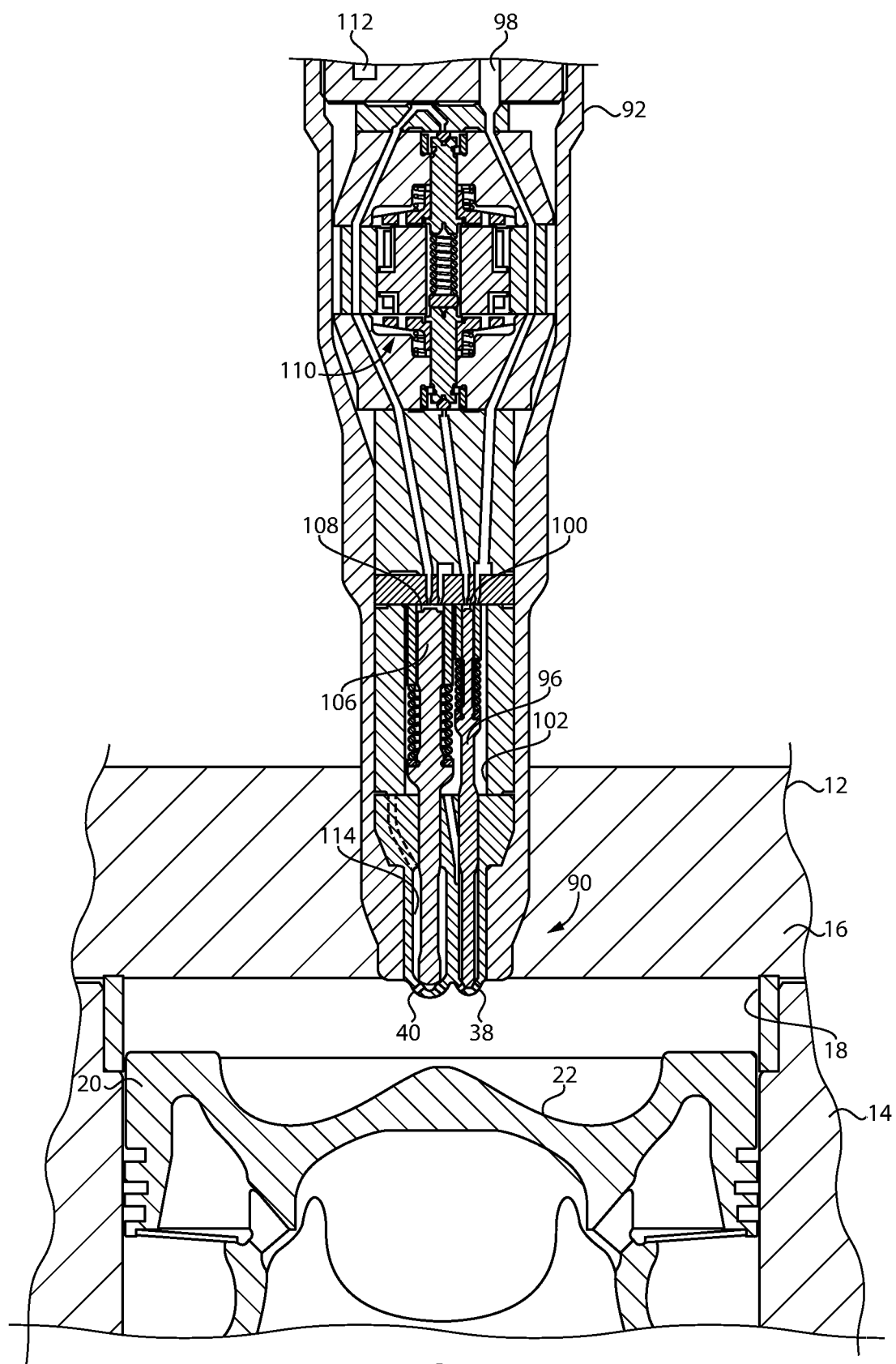
FIG. 2 is a sectioned side diagrammatic view of a portion of a dual fuel engine system as in FIG. 1.

Focusing now on FIG. 2, fuel system 34 also includes a plurality of fuel injection nozzle assemblies 90 in the plurality of fuel injectors 92. Each cylinder 18 in engine system 10 may be associated with one fuel injector operable to selectively inject both of the first fuel and the second fuel, or two separate fuel injectors operable to selectively inject the first fuel and the second fuel. Each cylinder 18 in engine 12 will be associated with at least one fuel injection nozzle assembly 90 that includes first fuel outlet set 38, a first injection valve 96 movable to open and close the respective first fuel outlet set 38 to pressurized fuel reservoir 42, a second fuel outlet set 40, and a second injection valve 106 movable to open and close second fuel outlet set 40 to one of second fuel pump outlets 56.

In the embodiment shown, fuel injector 92 includes a first fuel inlet 98 that receives a feed of the first fuel from pressurized fuel reservoir 42, and a second fuel inlet 112 that receives a feed of the second fuel from one of second fuel pumps 52. A fuel chamber 102 is formed in fuel injector 92 and fluidly connected to first fuel inlet 98, and fluidly connects to first fuel outlet set 38 when first injection valve 96 is opened. A second fuel chamber 114 fluidly connects to fuel inlet 112 and is fluidly connected to second fuel outlet set 40 when second injection valve 106 is opened. First fuel injection valve 96 includes a hydraulic control surface 100 exposed to a fluid pressure of pressurized fuel reservoir 42. Second injection valve 106 also includes a hydraulic control surface 108 exposed to a fluid pressure of pressurized fuel reservoir 42. In this way, it will be appreciated that each of first fuel injection valve 96 and second fuel injection valve 106 is controlled at least in part based on a fuel pressure of the fuel contained in pressurized fuel reservoir 42, and typically including diesel. Fuel injector 92 also includes an injection control valve assembly 110. Injection control valve assembly 110 is electrically actuated, and can include two solenoid actuators to separately and independently vary a closing hydraulic pressure on hydraulic control surfaces 100 and 108 to control a start of injection timing, an end of injection timing, an injection quantity and potentially other characteristics of fuel injection.

It will be recalled that the first fuel may be a diesel distillate fuel, and the second fuel may be an alcohol fuel such as methanol. Diesel fuels are more energy dense than methanol, typically requiring a relatively larger fuel injection quantity for a given engine power output. Engine system 10 can be operated in a diesel-only mode, or a pilot-ignited dual fuel mode. In the diesel-only mode the engine power output requirements are satisfied by compression-ignition combustion of solely diesel fuel. Operating in such a mode includes injecting only diesel fuel using only injection valve 96. In the dual fuel mode a relatively small diesel pilot injection of a pilot quantity is delivered into cylinder 18 to compression ignite a larger charge or larger quantity injection of methanol using injection valve 106. Fuel injector 92 will typically be designed such that each respective first fuel outlet set 38 and first injection valve 96 in the respective nozzle assembly 90 together define a lesser nozzle steady flow, and each respective second fuel outlet set 40 and second injection valve 106 together define a greater nozzle steady flow. Steady flow, including nozzle steady flow, is a well-known attribute respecting fuel injectors, and refers to a flow that can be expected given equivalent conditions. Thus, for a given fuel pressure and a given open time a greater quantity of fuel could be expected to inject through second fuel outlet set 38 having a greater nozzle steady flow as compared to a nozzle steady flow of first fuel outlet set 40. Individual fuel spray outlets or orifices in second fuel outlet set 40 may be larger in size and/or larger in number than a size and/or a number of the individual outlets in first fuel outlet set 38.

Figure 3:
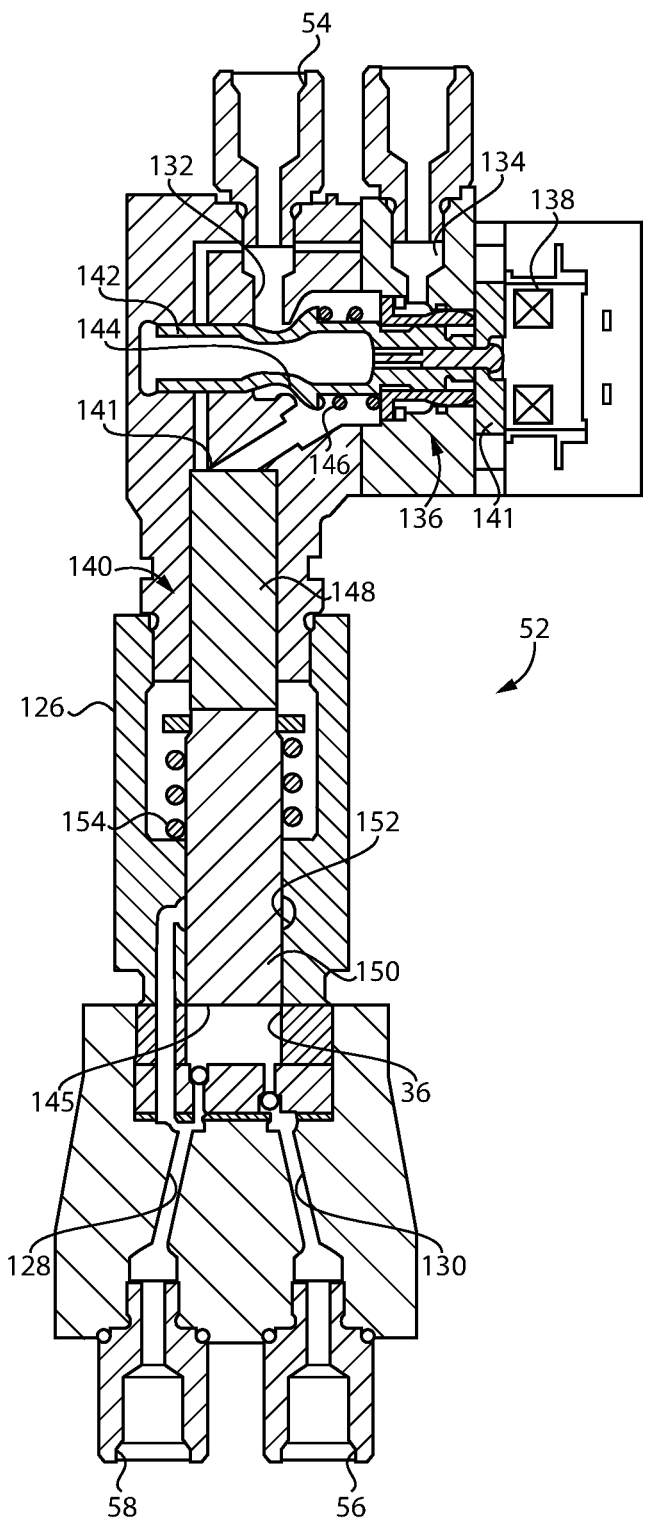
FIG. 3 is a sectioned side diagrammatic view of a pump unit for use in a dual fuel engine system as in FIGS. 1 and 2.

FIG. 3 shows an example one of second fuel pumps 52 in further detail, including a pump housing 126 forming a fuel inlet passage 128 extending from second fuel inlet 58 to a pumping chamber 36, and a pressurized fuel outlet passage 130 extending from pumping chamber 36 to second fuel pump outlet 56 and thence to second fuel outlet set 40. As noted above, within the scope of the present disclosure a pressurized fuel outlet flow from a second fuel pump 52 may extend to a single nozzle outlet set, to a plurality of nozzle outlet sets, or to a pressurized fuel reservoir that in turn feeds pressurized fuel to nozzle outlet sets for injection. Pump housing 126 also forms an actuating fluid inlet passage 132 extending from actuating fluid inlet 54, and an actuating fluid drain passage 134. Pump 52 further includes a flow control valve assembly 136. Flow control valve assembly 136 includes an electrical actuator 138, such as a solenoid actuator, coupled to an armature 141 in turn coupled to an electrically actuated flow control valve 142. Electrically actuated flow control valve 142 may be positioned fluidly between actuating fluid inlet 54 and actuating surface 141. Energizing flow control valve assembly 136 can cause flow control valve 142 to open a seat 144 in opposition to a biasing force of a return spring 146. Opening seat 144 enables a flow of pressurized actuating fluid, including the pressurized first fuel, to flow through actuating fluid inlet passage 132 and act on actuating surface 141, driving pumping element 140 downward in a pumping stroke to pressurize the second fuel in pumping chamber 36.

As suggested above, a flow rate of the second fuel is desirably greater than a flow rate of the first fuel based at least in part upon the lesser energy density of the second fuel. To enable a flow rate of the second fuel from second fuel pumps 52 that is greater than a flow rate of the first fuel acting as actuation fluid, a pumping element 140 of pump 52 may include a reverse intensifier plunger wherein an actuating surface 141 has a first area and a pumping surface 145 positioned opposite to the actuating surface and exposed to pumping chamber 36 has a second area larger than the first area. In other embodiments rather than reverse intensifying or de-intensifying, the pumped second fuel may be intensified in pressure. A pumped second fuel de-intensified in pressure might be a fuel having an energy density greater than the first fuel used as an actuation fluid. In still other instances, the first fuel and second fuel could have similar or substantially equal energy densities, in which case no intensification at all might be used and a ratio of flow of the first fuel used for actuation to the pumped second fuel might be approximately 1:1.

Figure 4:
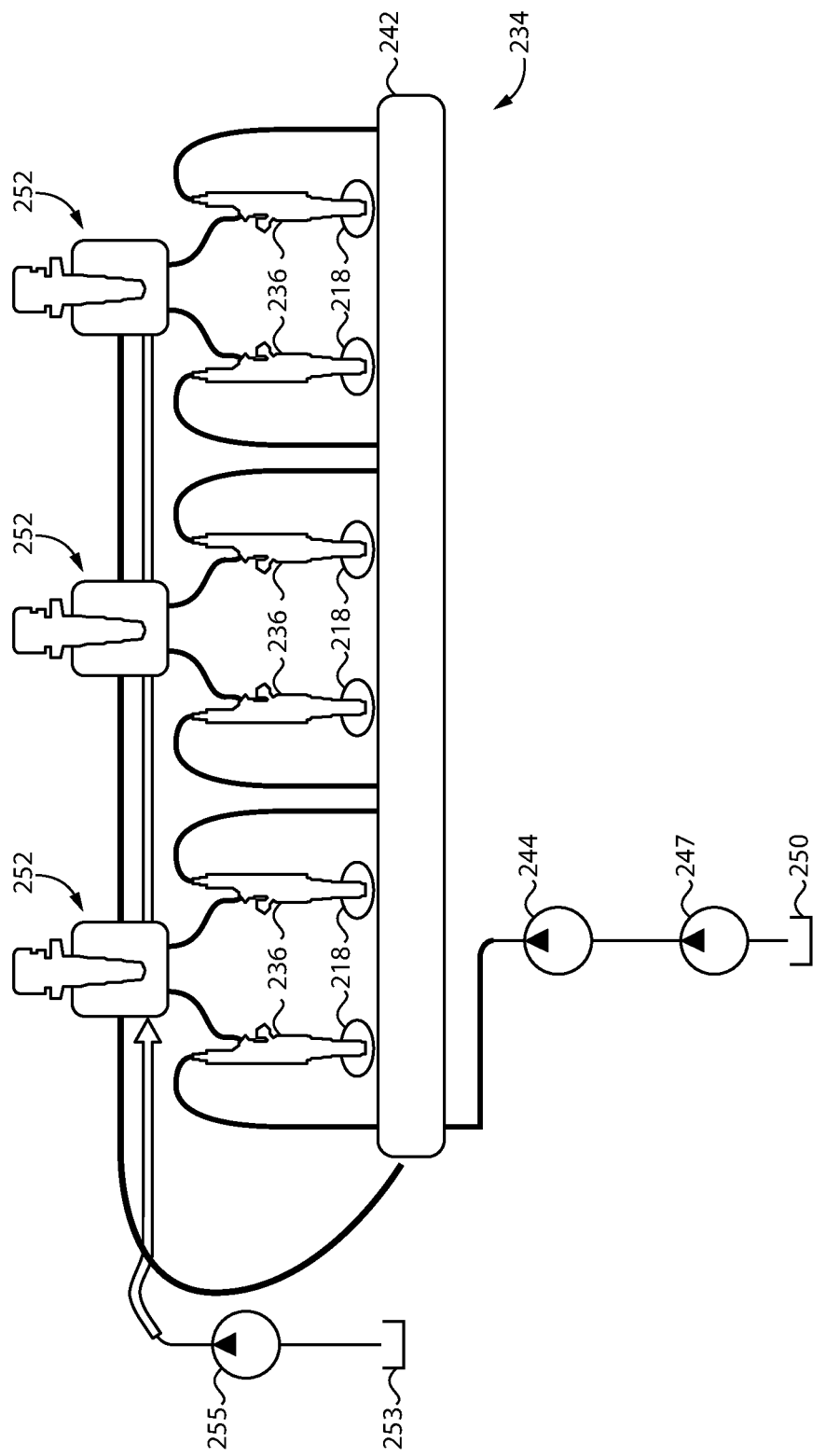
FIG. 4 is a diagrammatic view of a dual fuel system, according to another embodiment.

Pumping element 140 may include a two-piece plunger having a first plunger piece 148 with actuating surface 141 formed thereon and a separate second plunger piece 150 having pumping surface 145 thereon. A single plunger piece having the respective surfaces typically differing in area could also be used. In this way, a relatively lesser flow rate and a higher pressure of the first fuel produces a relatively greater flow rate and a lower pressure of the second fuel. An annulus 152 may be formed in pump housing 126 and extends around second plunger piece 150 for lubrication and collection of fuel that escapes past a clearance between second plunger piece 150 and pump housing 126. Annulus 152 may fluidly connect to inlet passage 128 as illustrated. Moving pumping element 140 in a pumping stroke, downward in the FIG. 4 illustration, can occur in opposition to a bias of a return spring 154. Suitably arranged check valves (not numbered) may be positioned fluidly between pumping chamber 36 and inlet passage 128 and outlet passage 130, respectively.

Referring now to FIG. 4, there is shown a dual fuel system 234 according to another embodiment and including a plurality of fuel injectors 236 associated with a plurality of cylinders 218 in a dual fuel engine system. Fuel injectors 236 may be configured analogously to fuel injector 92 discussed above, including dual concentric outlet sets, side-by-side outlet sets, or potentially separate fuel injectors for the two separate fuels. Dual fuel system 234 also includes a first fuel supply 250 containing a compression ignition liquid fuel, a fuel transfer pump 247 and a high pressure pump 244 structured to pressurize the first fuel and supply the same to a pressurized fuel reservoir 242. Dual fuel system 234 also includes a second fuel supply 253 containing a second liquid fuel or potentially a gaseous fuel, analogous to fuel supply 53 discussed above, a transfer pump 255, and a plurality of second fuel pumps 252. Whereas in the embodiment discussed above and shown in FIG. 1 each second fuel pump 52 is associated with one fuel injector, in the embodiment of FIG. 4 each second fuel pump 252 is associated with multiple fuel injectors, in the illustrated case two.

It will thus be appreciated that in the embodiment of FIG. 4 high pressure second fuel conduits would be understood to extend to a plurality of second fuel outlet sets of dual fuel system 234. Put differently, rather than singular unit pumps for each cylinder in the embodiment of FIG. 4 each second fuel pump pressurizes the second fuel for delivering to multiple fuel injectors in separate cylinders. Other arrangements could include a second fuel pump associated with more than two fuel injectors and more than two cylinders or a pressurized fuel reservoir as discussed herein. A number of fuel injectors in any embodiment will typically be equal to a number of the first fuel outlet sets and equal to a number of the second fuel outlet sets in the dual fuel system.

INDUSTRIAL APPLICABILITY

As discussed above, engine system 10 can be operated in multiple different modes, including a dual fuel mode where a relatively small pilot injection of the first fuel is compression ignited to ignite a larger injection of the second fuel in cylinder 18. It remains desirable for engine system 10 to be capable of operating in a single-fuel, diesel-only mode. For this reason first fuel pump 44 will typically be configured with sufficient capacity to operate engine system 10 solely upon diesel across a full speed and load range. This means that, at times, and including in a dual fuel mode, first fuel pump 44 has extra capacity meaning first fuel pump 44 can be operated to pressurize the first fuel in pressurized fuel reservoir 42 to be injected as a relatively small quantity for ignition of the second fuel, and also supply the first fuel for actuation of the plurality of second fuel pumps 52 to pressurized the second fuel for injection.

Referring to the drawings generally, but focusing on the embodiment of FIG. 1, operating a dual fuel system in a dual fuel mode may include feeding a pressurized first fuel from first fuel pump 44 to pressurized fuel reservoir 42, and feeding the pressurized first fuel to actuating fluid inlets 54 of the plurality of second fuel pumps 52. Operating a dual fuel system according to the present disclosure further includes actuating the plurality of second fuel pumps 52 via the pressurized first fuel to pressurize the second fuel. The pressurized first fuel is injected from a first fuel outlet set 38 fluidly connected to pressurized fuel reservoir 42 into cylinder 18 in engine 12. The pressurized second fuel is injected from second fuel outlet sets 40 each fluidly connected to one of the plurality of second fuel pumps 52 into cylinder 18. As discussed above, in the illustrated embodiment, the pressurized first fuel is fed to actuating fluid inlets 54 directly from pressurized fuel reservoir 42. In other embodiments, a different plumbing strategy for feeding the first fuel at a pump outlet pressure to actuating fluid inlets 54 might be used, such as feeding the pressurized first fuel directly from a pump outlet of first fuel pump 44 or even selectively from at least one and potentially both of pressurized fuel reservoir 42 and a pump outlet of first fuel pump. The pressurized first fuel can be compression-ignited in each cylinder, causing ignition of the injected second fuel. Injection of the first fuel may occur just prior to a top-dead-center position of the corresponding piston completing a compression stroke, with injection of the second fuel typically occurring just after injection of the first fuel although an overlap in timing of the respective injections is within the scope of the present disclosure. Still other combinations of first fuel and second fuel and the order in which they are introduced into the cylinder are also within the scope of the present disclosure. For example, a small amount of the second fuel might be injected just prior to an injection of the first fuel, then followed by a larger amount of the second fuel. Such a strategy or still others may optimize engine performance and emissions under certain operating conditions.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A dual fuel engine system comprising:
    an engine including a plurality of cylinders formed therein;
    a fuel system including at least one fuel injector associated with each respective one of the plurality of cylinders, and each at least one fuel injector having a first fuel outlet set and a second fuel outlet set;
    the fuel system further including a pressurized fuel reservoir, a first fuel pump having a first fuel pump outlet fluidly connected to the pressurized fuel reservoir, and a plurality of high pressure first fuel conduits each extending from the pressurized fuel reservoir to one of the first fuel outlet sets;
    the fuel system further including a plurality of second fuel pumps each having a pumping element, an actuating fluid inlet for fluidly actuating the pumping element, and a second fuel pump outlet, a plurality of low pressure second fuel conduits each extending to one of the plurality of second fuel pumps, and a plurality of high pressure second fuel conduits each fluidly connecting one of the second fuel pump outlets to at least one of the respective second fuel outlet sets; and
    the actuating fluid inlet of each respective one of the plurality of second fuel pumps is fluidly connected to at least one of the first fuel pump outlet or the pressurized fuel reservoir.

2. The engine system of claim 1 wherein each of the first fuel outlet sets and the second fuel outlet sets is positioned within one of the plurality of cylinders.

3. The engine system of claim 2 wherein each at least one fuel injector includes a first fuel injection valve movable to open and close the respective first fuel outlet set, and a second fuel injection valve movable to open and close the respective second fuel outlet set.

4. The engine system of claim 3 wherein each first fuel injection valve and second fuel injection valve includes a hydraulic control surface exposed to a fluid pressure of the pressurized fuel reservoir.

5. The engine system of claim 1 wherein each of the high pressure second fuel conduits extends to a plurality of the second fuel outlet sets.

6. The engine system of claim 1 wherein each respective pumping element of the plurality of second fuel pumps includes a hydraulically actuated pumping element having an actuating surface exposed to a fluid pressure of the respective actuating fluid inlet.

7. The engine system of claim 6 wherein each hydraulically actuated pumping element includes a plunger having a pumping surface opposite to the respective actuating surface, and an electrically actuated flow control valve positioned fluidly between the respective actuating fluid inlet and actuating surface.

8. The engine system of claim 7 wherein each of the hydraulically actuated pumping elements includes an intensifier or a de-intensifier, and wherein the actuating surface has a first area and the pumping surface has a second area different from the first area.

9. The engine system of claim 1 further comprising a first fuel supply containing a compression-ignition liquid fuel and fluidly connected to the first fuel pump, and a second fuel supply containing a second fuel, and wherein the engine further includes a plurality of pistons movable within the plurality of cylinders to increase a pressure therein to an autoignition threshold of the compression-ignition liquid fuel.

10. A method of operating a dual fuel system comprising:
    feeding a pressurized first fuel from a first fuel pump to a pressurized fuel reservoir;
    feeding the pressurized first fuel to actuating fluid inlets of a plurality of second fuel pumps;
    actuating a pumping element of each respective one of the plurality of second fuel pumps via the pressurized first fuel to pressurize a second fuel;
    injecting the pressurized first fuel from a first fuel outlet set fluidly connected to the pressurized fuel reservoir into a cylinder in an engine; and
    injecting the pressurized second fuel from a second fuel outlet set fluidly connected to one of the plurality of second fuel pumps into the cylinder.

11. The method of claim 10 wherein the feeding the pressurized first fuel to actuating fluid inlets includes feeding the pressurized first fuel from the pressurized fuel reservoir to the actuating fluid inlets.

12. The method of claim 10 further comprising intensifying or de-intensifying a pressure of the second fuel in the plurality of second fuel pumps relative to a pressure of the pressurized first fuel.

13. The method of claim 10 wherein the injecting the pressurized first fuel includes injecting a pilot quantity of the first fuel, and the injecting the pressurized second fuel includes injecting a larger quantity of the pressurized second fuel.

14. The method of claim 10 further comprising compression-igniting the first fuel in the cylinder, and igniting the second fuel in the cylinder via the compression ignition of the first fuel.

15. The method of claim 14 wherein the pressurized first fuel includes a high cetane fuel, and the pressurized second fuel includes a lower cetane fuel.

16. The method of claim 12 wherein the intensifying or de-intensifying a pressure of the second fuel includes de-intensifying the pressure via actuating a plunger in each of the plurality of second fuel pumps having an actuating surface exposed to a fluid pressure of the first pressurized fuel, and a pumping surface exposed to a pumping chamber containing the second fuel.

17. A dual fuel system comprising:
a plurality of fuel injectors each including at least one of a first fuel outlet set and a second fuel outlet set, and a number of the plurality of fuel injectors is equal to a number of the first fuel outlet sets and a number of the second fuel outlet sets in the dual fuel system;
a pressurized fuel reservoir;
a first fuel pump having a first fuel pump outlet fluidly connected to the pressurized fuel reservoir, and a plurality of high pressure first fuel conduits each extending from the pressurized fuel reservoir to one of the first fuel outlet sets;
a plurality of second fuel pumps each having an actuating fluid inlet and a second fuel pump outlet, a pumping element, a plurality of low pressure second fuel conduits each extending to one of the plurality of second fuel pumps, and a plurality of high pressure second fuel conduits each fluidly connecting one of the plurality of second fuel pump outlets to at least one of the respective second fuel outlet sets; and
a plurality of actuating fluid conduits each extending from the first fuel pump or the pressurized fuel reservoir to the actuating fluid inlet of one of the plurality of second fuel pumps for fluidly actuating the respective pumping elements.

18. The dual fuel system of claim 17 wherein each of the plurality of second fuel pumps includes an intensifier having an actuating surface exposed to a fluid pressure of the respective actuating fluid inlet, and a pumping surface opposite to the actuating surface.

19. The dual fuel system of claim 18 wherein the intensifier includes a reverse intensifier, and wherein the actuating surface has a first area, and the pumping surface has a second area larger than the first area.

20. The dual fuel system of claim 17 wherein each of the plurality of fuel injectors includes a first injection valve movable to open and close the first fuel outlet set, and a second injection valve movable to open and close the second fuel outlet set, and wherein each of the first injection valve and the second injection valve includes a hydraulic control surface exposed to a fluid pressure of the pressurized fuel reservoir.

* * * * *